United States Patent Office 3,421,644
Patented Jan. 14, 1969

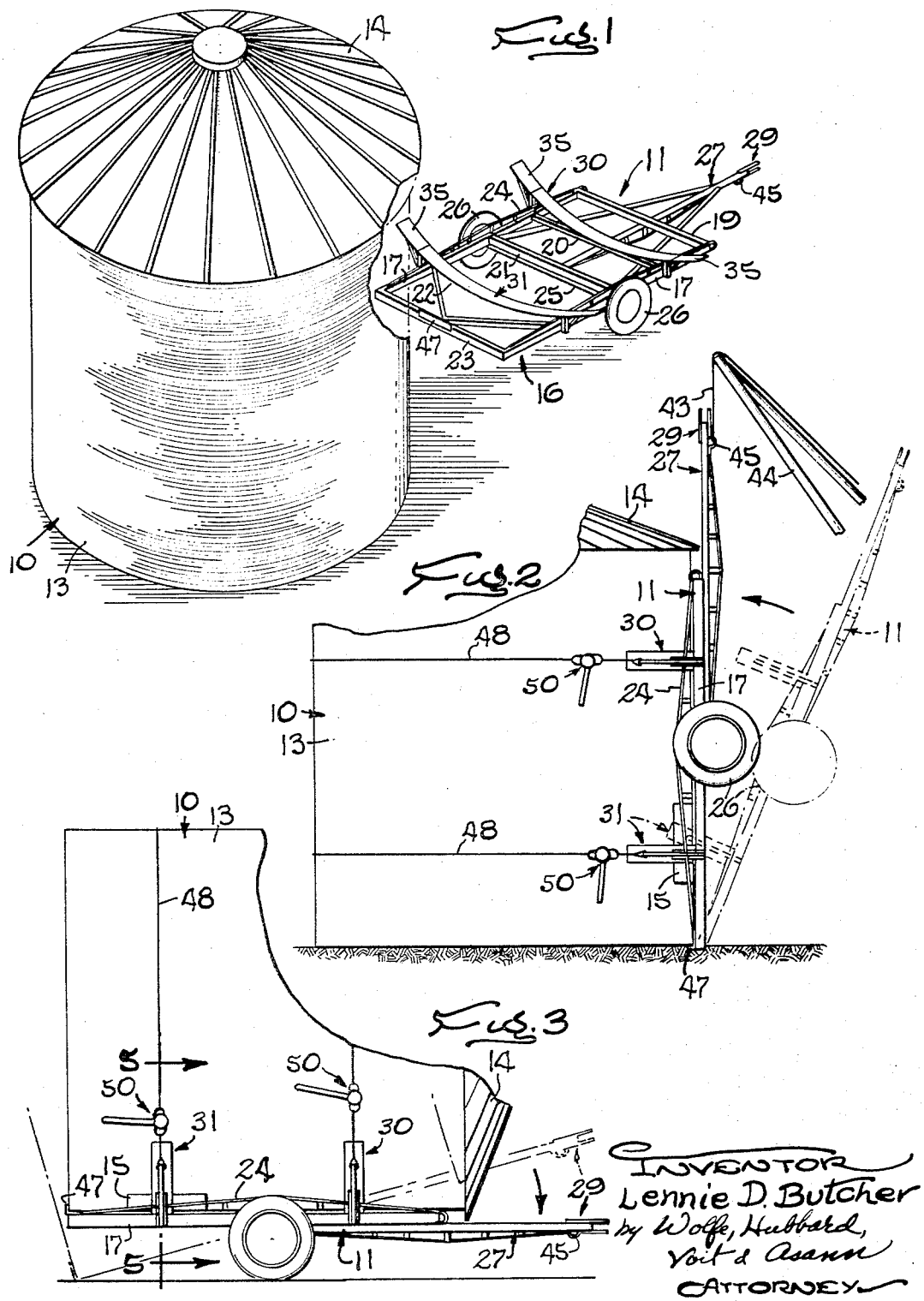

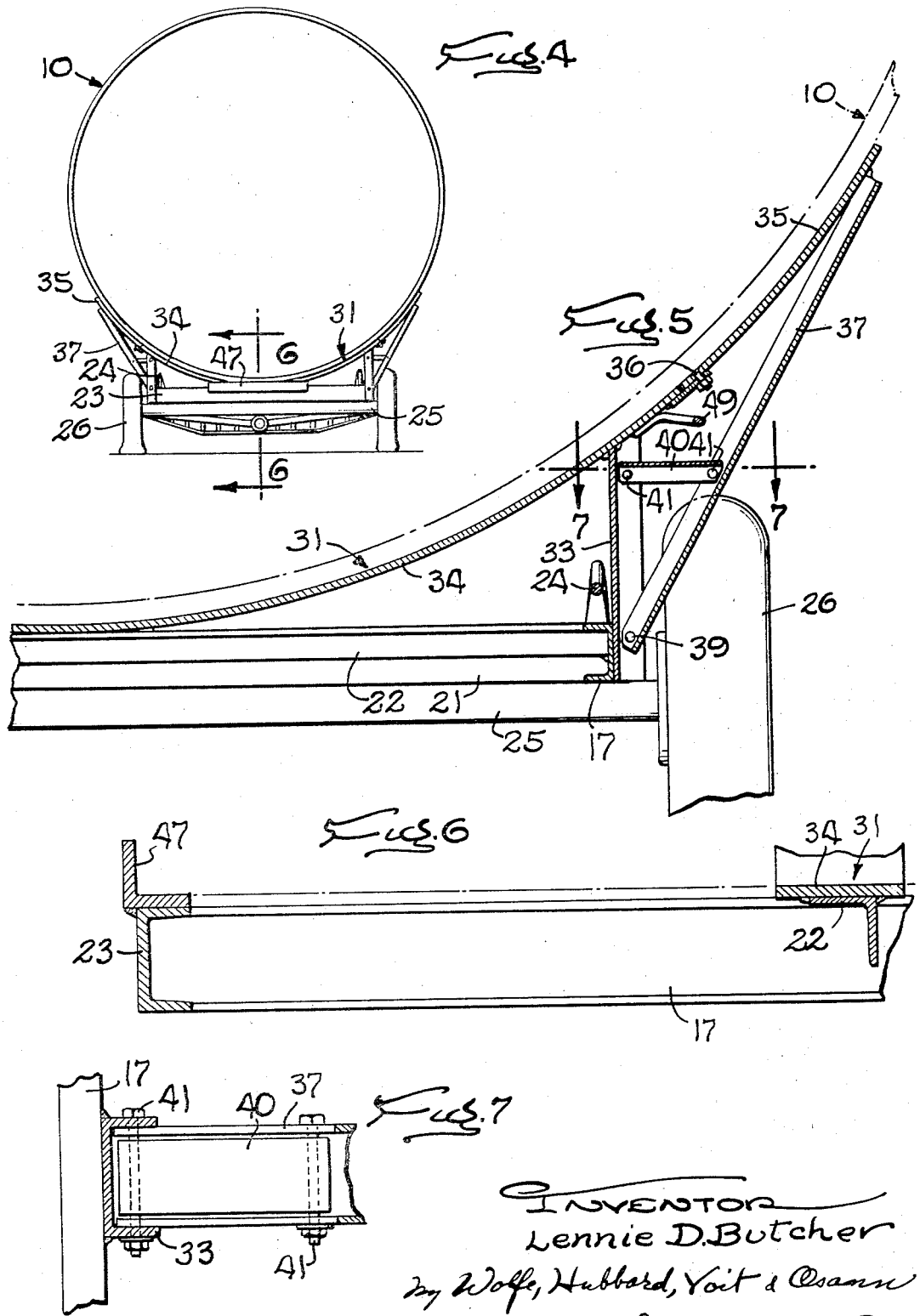

3,421,644
METHOD AND APPARATUS FOR TRANSPORTING GRAIN BINS
Lennie D. Butcher, E. Jackson St. Road, Macomb, Ill. 61455
Filed Aug. 17, 1967, Ser. No. 661,257
U.S. Cl. 214—500     4 Claims
Int. Cl. B60p 1/04

ABSTRACT OF THE DISCLOSURE

For transporting an initially upright grain bin of circular cross-section from one location to another, a trailer is formed with two arcuately curved bands which receive and cradle the bin when the trailer is turned into an upright position alongside the bin. After the bin has been strapped to the bands, the trailer and the attached bin are lowered into a horizontal transport position and are towed to the new location of the bin, the bands extending around and supporting substantial arcs of the bin during such towing to preserve the original cross-section of the bin and to prevent the bin from collapsing under its own weight. Upon reaching the new location of the bin, the trailer once again is turned into an upright position, the bin is unfastened from the bands, and the trailer is lowered away from the bin to leave the bin standing and to free the trailer for subsequent use.

Background of the invention

This invention relates to a method and apparatus for transporting metal grain bins of the type used for storing surplus corn, wheat, and the like. Because of the large size and weight of such bins and because they end to collapse when turned on their sides, it has been the practice in the past to move used or second-hand bins from farm-to-farm by disassembling the many different sections of the bins at the first farm, by hauling the separate sections to the second farm, and then by re-assembling the sections at the new location of the bins. This involves so much labor and expense that it usually is very difficult to sell used bins, and those that are sold are sacrificed at prices far below their actual value.

Summary of the invention

The primary aim of the present invention is to transport grain bins quicker, easier and with less cost than has been possible heretofore by moving each bin as a unitary assembly thereby to eliminate the need of disassembling and re-assembling the bin. More specifically the invention contemplates transporting grain bins by turning a trailer into an upright position alongside the bin, by fastening the bin to the trailer, and then by lowering the trailer and the attached bin into a horizontal transport position. After the bin has been towed to its new location, it may be set up by following a somewhat similar procedure.

The invention also resides in the novel construction of the trailer to enable transportation of the bin as a unitary assembly without danger of the bin collapsing under its own weight. More detailed objects of the invention are to support the bin on the trailer on an arcuate saddle which preserves the circular cross-section of the bin, and to reduce the overall width of the saddle to facilitate movement of the unloaded trailer on open highways.

Brief description of the drawings

FIGURE 1 is a perspective view of the bin and a novel trailer embodying the features of the present invention.

FIG. 2 is a fragmentary side elevation showing the bin and the trailer in upright positions.

FIG. 3 is a view similar to FIG. 2 and showing the bin and the trailer in horizontal transport positions.

FIG. 4 is an end view of the trailer and the attached bin.

FIG. 5 is an enlarged fragmentary cross-section taken substantially along the line 5—5 of FIG. 3.

FIG. 6 is an enlarged fragmentary cross-section taken substantially along the line 6—6 of FIG. 4.

FIG. 7 is an enlarged fragmentary cross-section taken substantially along the line 7—7 of FIG. 5.

Description of the preferred embodiment

The present invention contemplates a new and extremely simplified method and apparatus for transporting an assembled grain bin 10 from one location to another by turning a trailer 11 on end and into an upright position alongside the bin, by fastening the bin securely to the trailer, and by lowering the trailer and the bin into a horizontal transport position and towing the bin to the new location. At such location, the trailer again may be turned on end, the bin may be detached from the trailer, and the trailer may be lowered away from the bin to leave the latter standing in its place of subsequent use. Accordingly, there is no need to disassemble and re-assemble the bin to accomplish the transfer and, as a result, the bin can be transported easier, more rapidly and with considerably less expense than has been possible in the past.

The grain bin 10 shown in the drawings for purposes of illustration is of the type conventionally used for storing surplus crops such as corn, oats, beans and other similar commodities. A typical bin is formed with a cylindrical body 13 approximately eighteen feet in diameter and made of corrugated aluminum or steel. The body is topped by a coned roof 14 which increases the height of the bin to about eighteen feet and which causes the overall weight of the bin to be in the vicinity of 3,000 lbs. While a bin of these specific dimensions is among those most commonly found throughout the country, the present invention also encompasses the transportation of bins of different sizes, such as bins ranging in diameter from twelve to twenty-four feet. To enable unloading of the grain out of the bin, the body 13 is formed with a door 15 (FIG. 2) located on one side of the body near the level of the ground.

As shown most clearly in FIG. 1, the trailer 11 for transporting the bin 10 comprises an elongated frame 16 formed by a pair of fore-and-aft extending side rails 17 interconnected by five cross members 19 to 23 extending transversely of the rails. Rigidity is added to the frame by truss-like members 24 (FIG. 2) fastened to and extending along the upper sides of the rails to keep the latter from bowing intermediate their ends under the weight of the bin. To support the frame, an axle 25 (FIG. 5) underlies the center cross member 21 and projects laterally from the side rails to journal a pair of wheels 26 for rotation about horizontal axes. A tongue assembly 27 is fastened to and projects forwardly of the frame and carries at its free end a hitch 29 for attaching the trailer to a towing vehicle (not shown) which may be a tractor or a pick-up truck.

An important feature of the invention resides in the novel construction of means attached to the frame 16 for supporting the bulky bin 10 on its side while preserving the circular cross-section of the bin to prevent the bin from collapsing or flattening out into an ellipse under its own weight during transport. Herein, these means comprise an upwardly opening saddle which preferably but not necessarily is formed by two arcuately curved steel strips or bands 30 and 31 spaced apart from each other along the frame a distance of about eight feet and sized and shaped to provide firm support for the bin. Each band is of upwardly concave configuration and herein is curved on approximately a nine foot radius to define an upwardly opening seat correlated with the diameter of the bin for cradling the latter. The bands 30 and 31 extend transversely of the frame and are welded securely at their arcuate mid-points to the upper sides of the cross members 20 and 22, respectively. In order to prevent the bin from collapsing, bands of this type, for an eighteen foot bin, should be at least fourteen feet in arcuate length, should embrace at least a 90 degree arc of the lower circumference of the bin, and should have a transverse spacing of about thirteen feet between their free upper ends. In this way, the sides of the bin are firmly supported in and cradled by the bands and are constrained against spreading outwardly into an elliptical shape when the bin is turned on its side. In this specific instance, extremely solid support of the bin is insured through the use of bands which preferably are of sufficient arcuate length to embrace slightly over a 120 degree arc of the lowermost circumference of the bin. Braces 33 (FIG. 5) upstanding from the side rails 17 and fastened to the undersides of the bands prevent the bands from flexing downwardly when the bin is being carried by the trailer.

Advantageously, each band 30, 31 is formed of three sections, namely, a central section 34 (FIG. 5) which is welded to one of the cross members 20, 22, and two wing sections 35 which are fastened to the ends of the central section by bolts 36. By removing the wings from the central section, the overall width of the trailer may be reduced to facilitate unrestricted movement of the trailer on main highways when the trailer is not loaded with a bin 10. Instead of being detachable from the central section, the wings alternately may be hinged to the central section and may be folded when it is desired to reduce the width of the trailer, each wing is braced by upwardly inclined bars 37 fastened at their upper ends to the wings and fastened at their lower ends to the braces 33 by bolts 39. The bars are rigidified by angle irons 40 extending horizontally between the bars and the upper end of the braces and detachably fastened by bolts 41. The bars are removed with the wings when it is desired to decrease the width of the trailer.

To move the bin 10 with the trailer 11 constructed as described above, the trailer is rolled into position at one side of the bin as shown in FIG. 1. A flexible line or cable 43 (FIG. 2) extending downwardly from a pivoted boom 44 on a truck (not shown) then is attached to a hook 45 near the hitch 29 and, by winding up or drawing in the cable on a winch (not shown) on the truck while raising the boom and backing the truck toward the bin, the trailer is turned on end and into upright position alongside the bin (see FIG. 2) with the wheels 26 facing away from the bin and with the bands 30 and 31 embracing the bin. Usually, the trailer is positioned to be raised alongside the door 15 on the bin so that the door will be facing the truck when the pin is subsequently set up at its new location. This is because the bin most often will be set up with the door facing the most unrestricted area at the new location, and this area provides the most room for maneuvering the boom truck.

After the trailer 11 has been turned into an upright position, the flange of an angle iron 47 (FIGS. 2 and 6) fastened to the upper side of the rear cross member 23 is slipped beneath the lower edge of the bin 10 to help support the bin as it is turned on its side. The angle iron 47 also restricts rearward movement of the bin during transport. Next, a flexible strap in the form of a chain 48 (FIG. 2) is fastened to a hook 49 (FIG. 5) near one end of each band 30 and 31, is wrapped around the bin, and is anchored to a similar hook on the other end of the band. Suitable ratchet-actuated tightening devices 50 fastened intermediate the ends of the chains may be operated to draw up the chains and cinch the bin tightly in the bands.

While the bin 10 fast on the trailer 11, the cable 43 is played out while the boom truck is moved away from the bin. Then, by maneuvering the truck and controlling the cable in a suitable manner, the trailer and the attached bin are tilted downwardly into a horizontal transport position shown in FIG. 3. After the cable has been unhooked, the trailer is hitched to the towing vehicle and the bin is transported to its new location. While the bin is turned on its side and is being transported, the arcuate bands 30 and 31 embracing the bin preserve its circular cross-section to prevent flattening out or collapsing of the bin.

To set up the bin 10, the cable 43 again is attached to the hook 45 and is wound up to turn the trailer 11 and the attached bin back into the upright position shown in FIG. 2. Thereafter, the chains 48 are unfastened and the trailer is lowered away from the bin. Thus, setting up as well as loading and transporting of the bin can be achieved in an extremely simple manner.

From the foregoing, it will be apparent that the present invention enables transportation of the bin 10 much quicker and easier than is possible by disassembling and re-assembling the bin. In spite of the hollow and somewhat flimsy construction of the bin, the arcuate saddle formed by the bands 30 and 31 effectively prevents collapse of the bin while it is turned on its side.

I claim as my invention:

1. A method of loading, transporting and setting up an initially upright metal grain bin at least 12 feet in diameter with a wheeled trailer, the bin being formed with a door in one side thereof and being hollow and susceptible of collapsing under its own weight when turned on its side, said method comprising the steps of, turning the trailer on end and into an upright position along the side of the bin having the door with the wheels of the trailer facing away from the bin, attaching the bin to the trailer on the side thereof away from the wheels, lowering the trailer and the attached bin into a substantially horizontal transport position with the trailer supported on the wheels and with the bin disposed on its side, towing the trailer and the attached bin to a different location, turning the trailer on end to tilt the attached bin ino an upright position, detaching the bin from the trailer, and lowering the trailer away from the bin and into a substantially horizontal position.

2. A trailer for transporting a collapsible grain bin of circular cross-section and at least 12 feet in diameter, frame having means on one end thereof for attachment to a towing vehicle, and a bin-supporting saddle fastened to the upper side of said frame and extending transversely of the frame, said saddle comprising a pair of curved, upwardly opening bands spaced apart longitudinally of said frame to receive and support axially spaced arcs of the bin when the latter is positioned with its axis disposed substantially parallel to the fore-and-aft axis of the frame, and each of said bands being curved on at least a six foot radius and extending through an arc of not less than 90 degrees to preserve the circular cross-section of the bin and to prevent the bin from collapsing under its own weight.

3. A trailer as defined in claim 2 in which each band is formed by a central section fastened to the frame and by two wings extending outwardly and upwardly from the central section, and means connecting said wings to said central section and permitting selective movement of the wings relative to said central section to enable reduction in the transverse dimension of the trailer.

4. A trailer for transporting a grain bin of circular cross-section at least 12 feet in diameter and height, said trailer comprising an elongated, wheel-supported frame having means on one end thereof for attachment to a towing vehicle, and a bin-supporting saddle fastened to the upper side of said frame and extending transversely of the frame, said saddle defining an upwardly opening and concavely curved seat positioned to receive the bin when the latter is positioned with its axis disposed substantially parallel to the fore-and-aft axis of the frame and to support two arcs of the bin spaced axially from one another at least four feet, said saddle being curved on at least a six foot radius and extending through an arc of not less than 90 degrees to preserve the circular cross-section of the bin and to prevent the bin from collapsing under its own weight.

References Cited

UNITED STATES PATENTS

| | | | |
|---|---|---|---|
| 457,811 | 8/1891 | Cook | 214—383 |
| 611,542 | 9/1898 | Wilson | 214—352 |
| 2,319,536 | 5/1943 | Deibel | 214—3 |
| 2,419,314 | 4/1947 | Donald | 214—374 |
| 2,624,483 | 1/1953 | Ketzel | 214—380 |
| 2,886,273 | 5/1959 | Wachob | 280—47.27 |
| 3,251,497 | 5/1966 | Simas | 214—515 |

FOREIGN PATENTS 1,136,218  9/1962  Germany.

ALBERT J. MAKAY, *Primary Examiner.*

U.S. Cl. X.R.

214—515, 152